H. D. TIEMANN.
APPARATUS FOR DRYING TIMBER AND OTHER MOISTURE BEARING SUBSTANCES.
APPLICATION FILED MAR. 15, 1910.

1,019,743.

Patented Mar. 5, 1912.

WITNESSES:

INVENTOR
Harry D. Tiemann

UNITED STATES PATENT OFFICE.

HARRY D. TIEMANN, OF WASHINGTON, DISTRICT OF COLUMBIA.

APPARATUS FOR DRYING TIMBER AND OTHER MOISTURE-BEARING SUBSTANCES.

1,019,743.     Specification of Letters Patent.     Patented Mar. 5, 1912.

Application filed March 15, 1910. Serial No. 549,572.

(DEDICATED TO THE PUBLIC.)

*To all whom it may concern:*

Be it known that I, HARRY D. TIEMANN, a citizen of the United States, and an employee of the Forest Service, United States Department of Agriculture. a legal resident of the District of Columbia, residing at the city of Washington therein, (whose post-office address is 1714 Q street,) have invented new and useful Improvements in Apparatus for Drying Timber and other Moisture-Bearing Substances, and have made application, by petition of even date herewith, under the act of March 3, 1883, chapter 143, (22 Stat., 625,) praying that Letters Patent therefor may be granted to me.

The invention herein described and claimed may be used by the Government of the United States or by any of its officers or employees in the prosecution of work for the United States, or by any person in the United States, without payment of any royalty thereon.

The following is the specification of the invention:

My invention relates to an improvement in dry kilns for lumber or chambers for drying moisture bearing substances, depending upon the principle of increasing the local circulation of the air and at the same time condensing the moisture therefrom by bringing the descending currents of air into contact with water.

The principle of cooling the descending currents of air, thereby increasing the local circulation and condensing the moisture therefrom, is well known. For this purpose the warm moist air is brought in contact with condensing surfaces, usually of metal, placed in an auxiliary passageway or chamber. The main difficulty with such condensing kilns is the erosion of the metal surfaces by the artificial moisture from the wood. What I claim in my invention as original and an improvement is the elimination of the metal surfaces by the direct use of water and also the doing away with the auxiliary chamber, by conducting the whole operation within the main drying chamber. To accomplish this result it is only necessary to have a kiln of the simplest type of construction, consisting essentially of a rectangular chamber having walls preferably of hollow tile or cement construction, a track upon which the truck full of lumber is run in, and with sufficient space beneath the track for the heating pipes or other means of heating.

The nature, characteristic features and scope of my invention will be readily understood by the following description taken in connection with the accompanying drawings, wherein—

Figure 1:
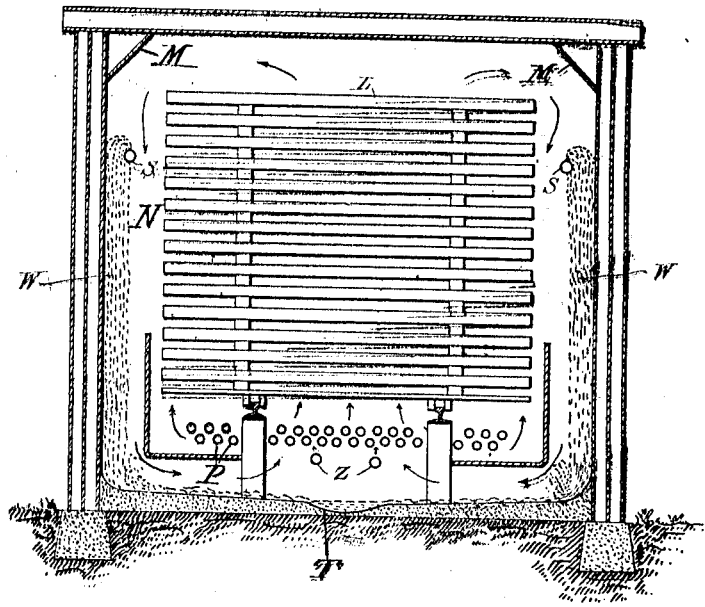
Figure 2:
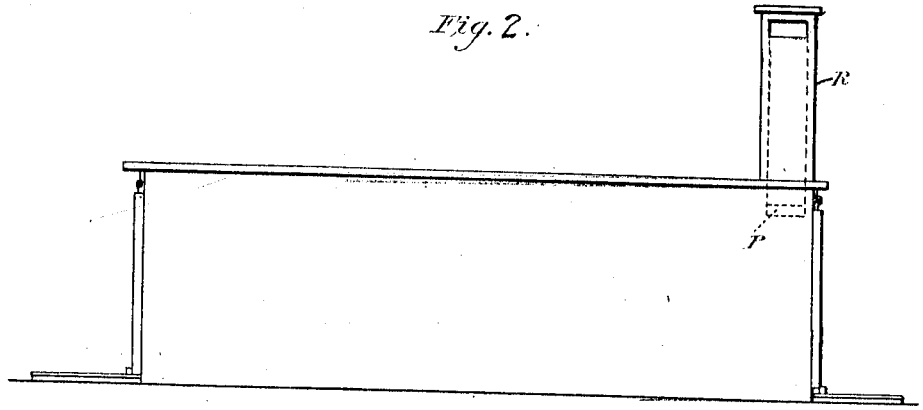

Figure 1, is a cross section of a drying chamber showing water trickling or flowing down the side walls thereof; and Fig. 2 is a side elevation of the kiln.

Referring to the drawings, L represents the pile of lumber to be dried, and P the heating pipes.

N indicates an unobstructed space between the lumber and the walls, sufficient to allow of a free passage of air. Arranged close to the end walls of said chamber or adapted to enter therethrough are water pipes, S S. These pipes, S S, are employed for directing a spray of water, W W, against the side walls. The water trickles or flows down the side walls into a trough, T, at the bottom, by which it is conducted out of the kiln.

M M designate baffle plates arranged to prevent counter currents of air and so to assist the natural circulation, and R indicates the exhaust chimney as shown in Fig. 2 of the drawings.

The operation is as follows: The heated air rises through the lumber as indicated by the arrows, taking on moisture and therefore becoming lighter as it rises. As it comes in contact with the side walls it is cooled by the spray of cool water and at the same time deprived of a certain amount of its moisture by condensation upon the water. A downward current of dry air therefore takes place close to the walls.

In beginning the drying operation in some cases, as with green lumber for instance, it may be necessary to humidify the upward current of air by supplying free steam directly to the air, or by bringing the air in contact with heated water before it reaches the lumber. This arrangement is applicable to either the "progressive" type of kiln or to the stationary type. In the "progressive" type, which consists in one or more long tunnel-like chambers in which the undried lumber is run into one end on trucks, progressively moved along as it dries, and finally taken out at the dry end, it is desirable to have an exhaust chimney, as shown in Fig. 2, at the charging or moist end, in order to create a sufficient current of air lengthwise of the chamber toward the moist end to hold the moisture at that end and secure a proper graduation of humidity from one end of the kiln to the other. Otherwise, the water condensers at the dry end would be called upon to remove an undue quantity of moisture detrimental to the economic working.

While I have shown in the drawings the application of this principle to one type of kiln, I do not restrict myself to its use with any specific type of drying apparatus, as it is manifest that it is applicable to many others.

To supply the necessary heat required to evaporate the moisture from the lumber requires an enormous circulation of air, on account of its small specific heat, and this circulation is necessarily chiefly an internal local one requiring more air than can be supplied from without except by strong forced draft. Good drying depends upon a uniform and sufficient supply of heat given by the circulating air to maintain the internal temperature of the wood and at the same time a control of the rate of the surface evaporation by the proper humidity of the circulating air. My improvement approaches these ideal conditions more nearly than any existing drying apparatus of which I am aware, and in addition economizes the heat as the same air is used repeatedly without being cooled to any great extent.

Having thus described my invention, I claim as follows:

In a kiln, comprising a drying chamber provided with heating pipes and pipes for admitting free steam, baffle plates suitably arranged for preventing counter currents of air within said chamber, an exhaust chimney for creating a current of air lengthwise of the chamber, a series of perforated water pipes arranged to enter through the end walls of said chamber and supply water to the side walls at a temperature less than that of the air, a trough at the bottom of said chamber for receiving the water therefrom, water flowing from said pipes and running down the walls of said chamber for increasing the internal circulation of the air by causing the descending current of air to come in contact with said running water, which said kiln is adapted to dry lumber and other moisture-bearing substances, substantially as shown.

Signed at Washington, D. C., this eleventh day of March, 1910.

HARRY D. TIEMANN.

Witnesses:
THOMAS G. SHEARMAN,
R. N. WILLIAMS, Jr.